A. HUMBERGER.
Corn Harvester.
No. 18,747.
Patented Dec. 1, 1857.
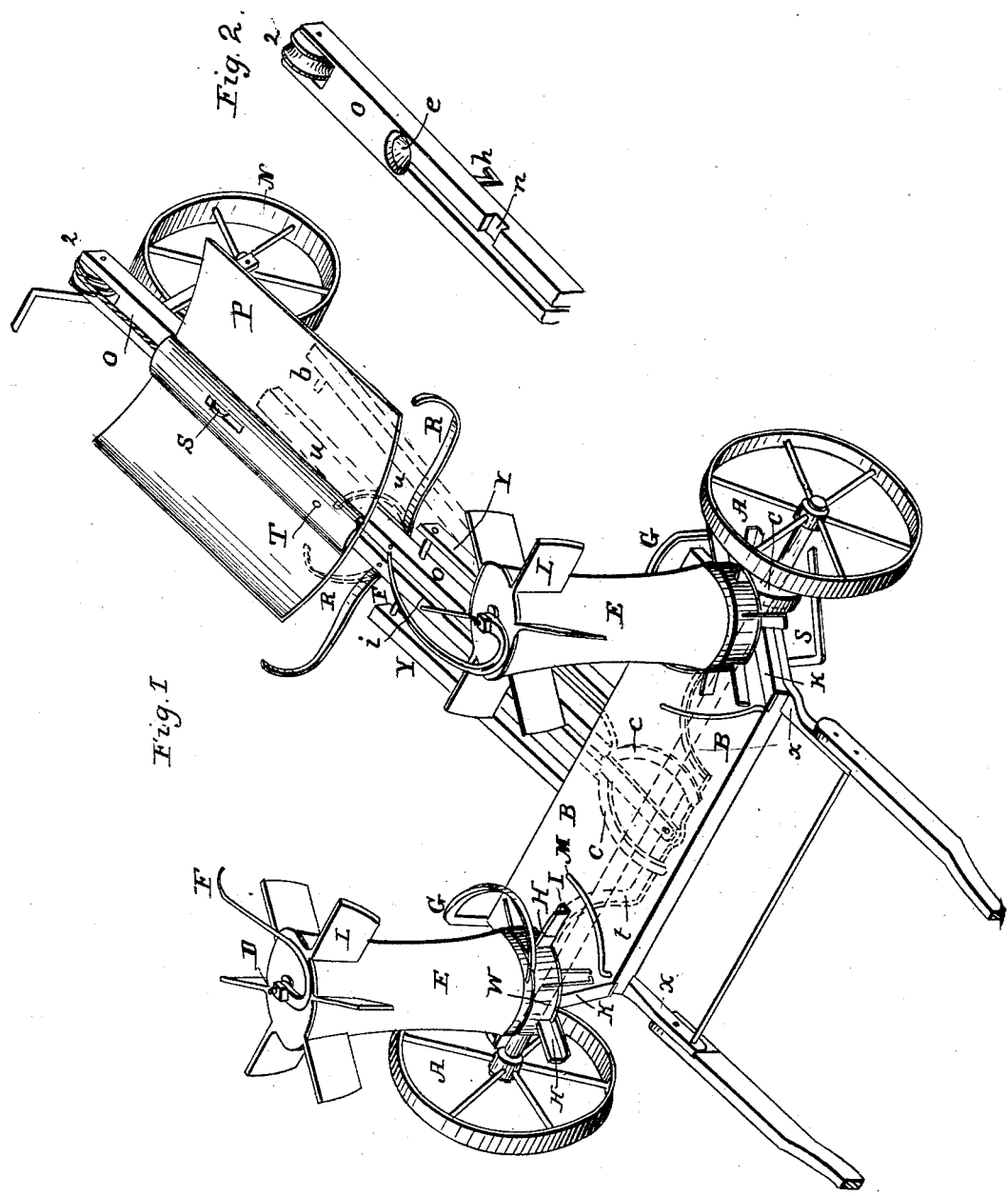
Inventor:
Adam Humberger

UNITED STATES PATENT OFFICE.

ADAM HUMBERGER, OF SOMERSET, OHIO.

IMPROVEMENT IN CORN-HARVESTERS.

Specification forming part of Letters Patent No. 18,747, dated December 1, 1857.

*To all whom it may concern:*

Be it known that I, ADAM HUMBERGER, of Somerset, in the county of Perry and State of Ohio, have invented a new and Improved Indian-Corn Cutter; and I do hereby declare that the following is a full and exact description thereof, reference being had to the accompanying drawings, and to the letters of reference marked thereon.

My invention consists of an improved Indian-corn cutter, by which two rows of corn may be cut, bound, and shocked with great ease and rapidity, the cutter being drawn by a horse and attended only by a boy.

In the accompanying drawing, Figure 1 represents a perspective view of my machine with the horse-shafts broken off.

The forward wheels, A A, are fixed in their axle and turn with it independently of the table B, which may be supported in any suitable manner, as by hounds $x\ x$. Upon the forward axle are also fixed two cog-wheels, C C, Fig. 1, which engage with two other cog-wheels attached to the lower ends of the shafts E E. These shafts are supported by the stationary axles D D, which are firmly attached to the hounds $x\ x$. By means of these cog-wheels the traveling wheels A A are rendered also driving-wheels, to move the shafts E E whenever the cutter is drawn forward. The shafts E E have radial arms H H, to which are riveted knives I I for cutting the stalks of corn. These arms H H are of such form as to catch the lower end of the cut stalks and prevent them from falling upon the ground. These arms may be conveniently made of cast-iron, the arms, the cog-wheel upon the shaft E, and a plate connecting the arms and said cog-wheel being all cast in one piece. The radial arms L L at the top of the shaft E may in like manner be cast upon the circumference of a plate, which connects them and serves to fasten them to the shafts E by means of screws passing through the plate and into the shaft. This shaft may be of wood, about a foot in diameter.

Near the bottom of shafts E E are grooves W W to receive the ends of the guards G G, so that the corn will slide freely past the end of the guard. Upon the table B are two stationary knives, K K, over which the knives I I revolve, so as to give a shear cut, which readily divides the stalks of corn. Now, as the cutter is drawn forward by the horse passing between two rows of Indian corn or maize one of said rows on each side comes between the revolving knives I I and the stationary knife K, and the stalks are easily and rapidly cut off and carried along by the arms H H over the table B.

The guards M prevent the lower ends of the stalks from too soon escaping beyond the reach of the arms H H, and the guards G G push the stalks free from the arms H H in time to let them fall back upon the carrier or binding-table P. As the lower ends of the stalks are thus carried backward the upper ends are also forced in the same direction by the arms L L until the guards F push them clear of these arms, when they fall backward upon the carrier P.

The binding-table or carrier may have two wheels, though I prefer but one, as shown in the drawings. To prevent a single wheel, N, from oversetting, I make the forward end of the coupling-bar O with two lateral arms, (seen in dotted lines at $c\ c$,) so as to give a broad bearing upon the bar $t$. (Also shown in dotted lines.) The forward end of this coupling-bar is lower than the other end, so that the movable table P will easily slide forward to the table B, where the former receives stalks of corn sufficient for a shock. The horse must be stopped for a minute while the tops of the stalks are clamped and bound. They are clamped by means of the jaws R R, which ride upon friction-rollers $v$, connected with the coupling-bar O. The lower ends of these jaws are attached to the lever U, (shown in red lines and in dotted lines,) which may be raised and lowered to open and close the jaws. When the jaws R are opened the lever U is supported by a hook, $h$, Fig. 2, attached to the coupling-bar O in such a position as to hook upon the pin $b$.

In order to clamp the corn, the lever is unhooked and the operator places his foot upon the lever to press it down and to bring the jaws into the position shown in red lines. When the shock of corn is properly bound the jaws of the clamp are again opened, and by means of the crank and pulley the table P is again drawn back to the position shown in the drawings. This table P has a friction-roller, S, and a guide-pin, T, which travel in the longitudinal groove $i$ in the coupling-bar. When the table P is drawn back, as shown in the drawings, the roller S rests in a concave socket, e, Fig. 2, in the top of a friction-pivot, connected with the coupling-bar O, and the pin T is opposite a notch, n, Fig. 2, in the lip of the groove i, so that the operator may easily turn the table crosswise of the coupling-bar and tilt the table so as to let the stalks slide from it to the ground, leaving them in an upright position, like a common shock of corn. In this manner the binding and shocking are accomplished with great rapidity and ease.

The frame Y Y is designed to steady the table P during the operation of loading and binding.

Under the axle may be seen two secondary knives, S S, which may be used for cutting the stubble close to the ground to facilitate plowing and seeding. These knives may be unscrewed and removed when not required.

I am aware that shafts with revolving arms and knives have been used in connection with guards for conducting cut stalks upon a platform or table. Therefore I do not claim these devices as heretofore employed; neither do I claim the carrying-table P when moved with its supporting-frame; but What I do claim, and desire to secure by Letters Patent of the United States, is—

1. The large shafts or rollers E E, turning upon the fixed axle D D, and having radial arms L L and H H, with knives I I, in combination with the guards M M, G G, and F F and knives K K, for the purpose of cutting the stalks and securely conducting them across the table B to the binding-table P, as set forth.

2. The table P, when movable upon its supporting-frame, in combination with lever U and clamps R R, for binding and shocking the corn, as set forth.

ADAM HUMBERGER.

Witnesses:
 DANIEL BREED,
 EDM. F. BROWN.